Sept. 24, 1968            D. L. PHILLIPS            3,402,466
METHOD OF FABRICATING SPIRALLY WOUND PIN CONNECTORS
Filed Dec. 7, 1964            10 Sheets-Sheet 1
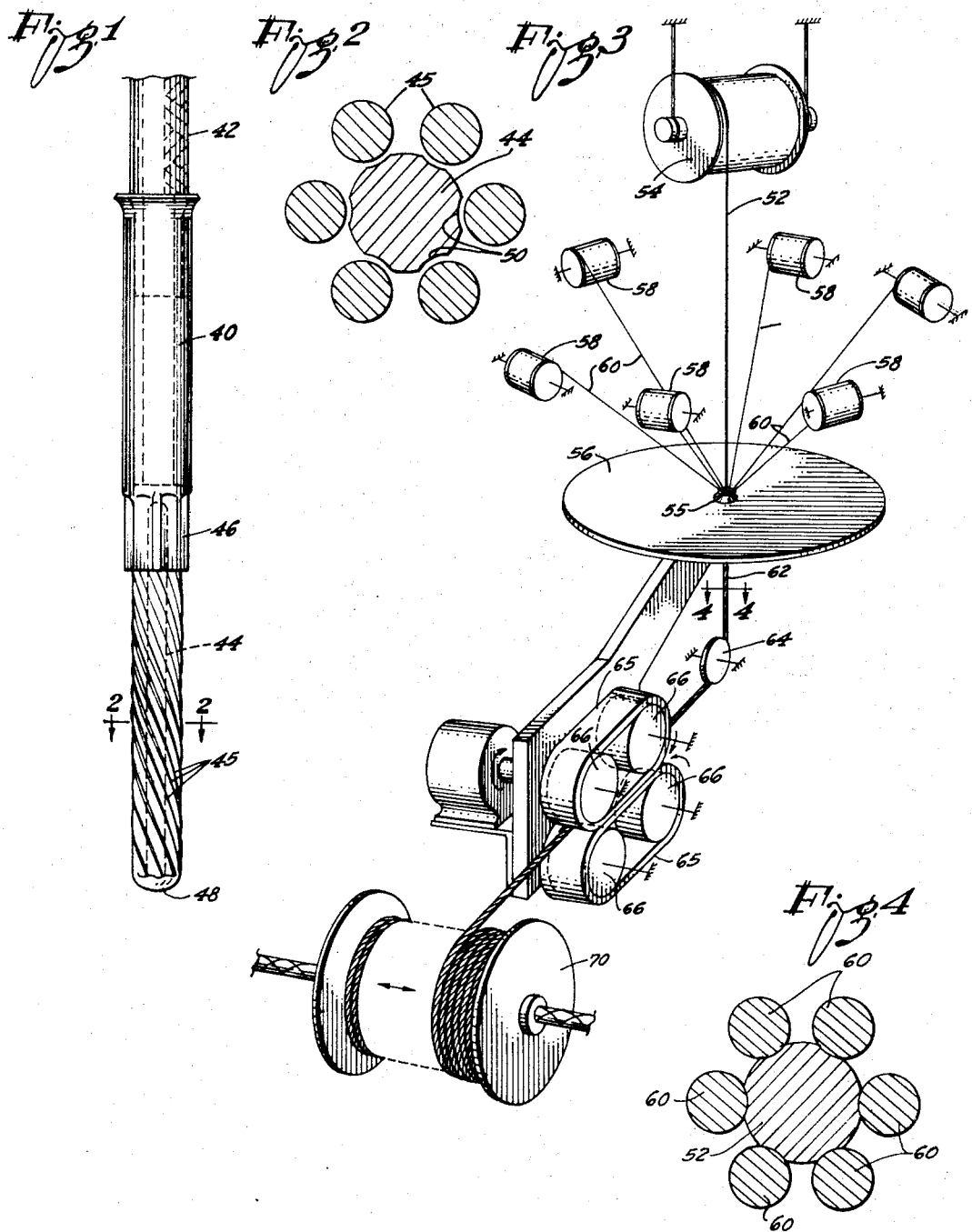
INVENTOR:
Delbert L. Phillips
Attorneys Sept. 24, 1968     D. L. PHILLIPS     3,402,466
METHOD OF FABRICATING SPIRALLY WOUND PIN CONNECTORS
Filed Dec. 7, 1964     10 Sheets-Sheet 2
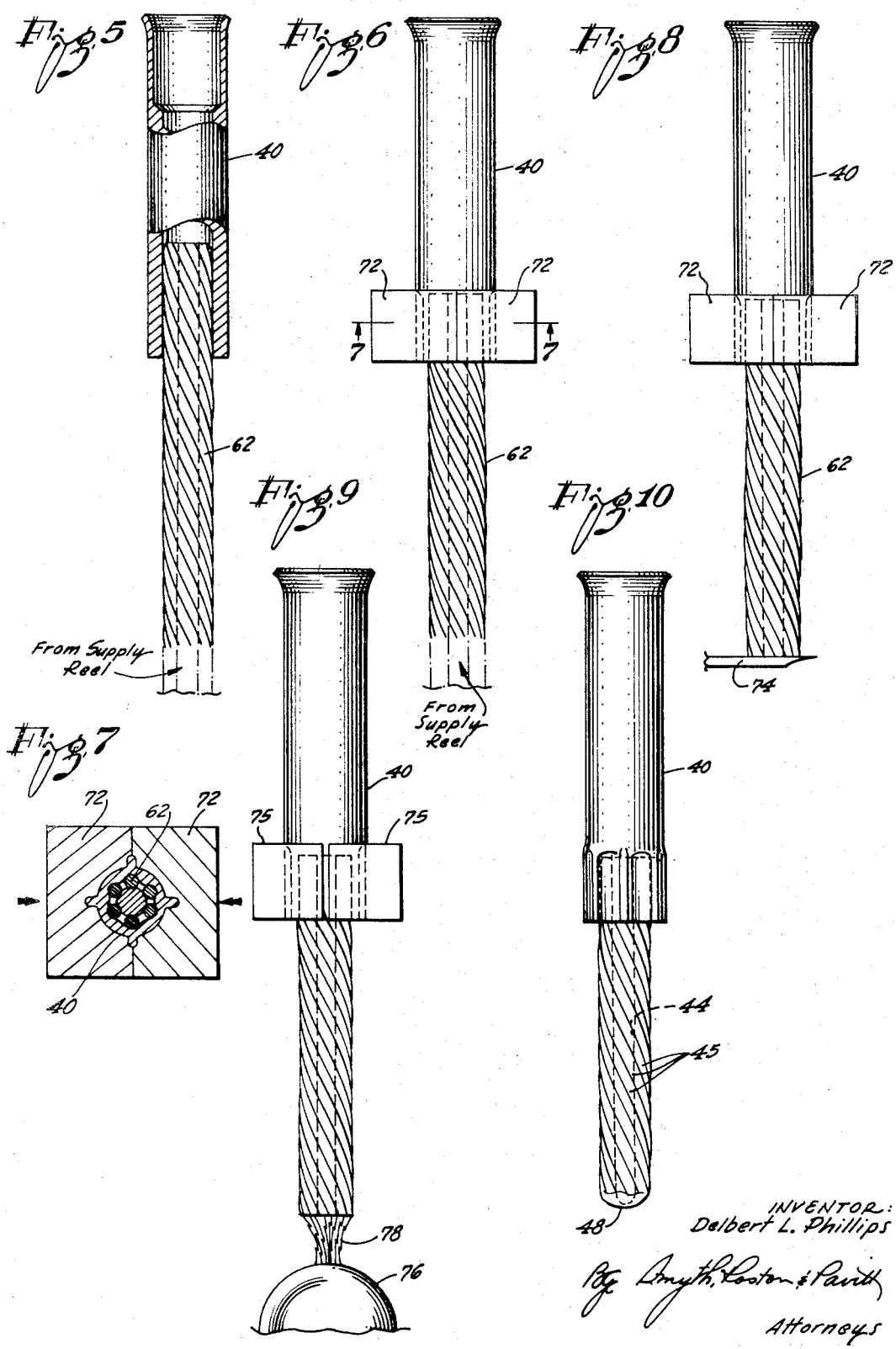
INVENTOR:
Delbert L. Phillips
Attorneys Sept. 24, 1968  D. L. PHILLIPS  3,402,466
METHOD OF FABRICATING SPIRALLY WOUND PIN CONNECTORS
Filed Dec. 7, 1964  10 Sheets-Sheet 3
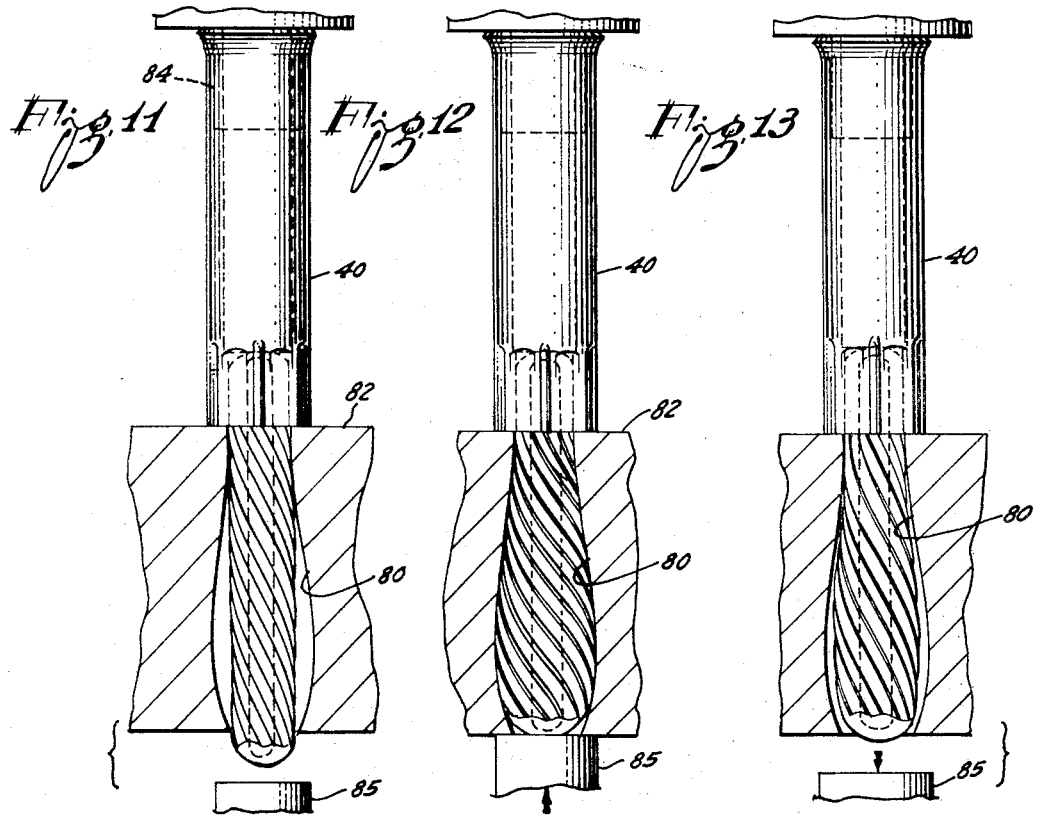
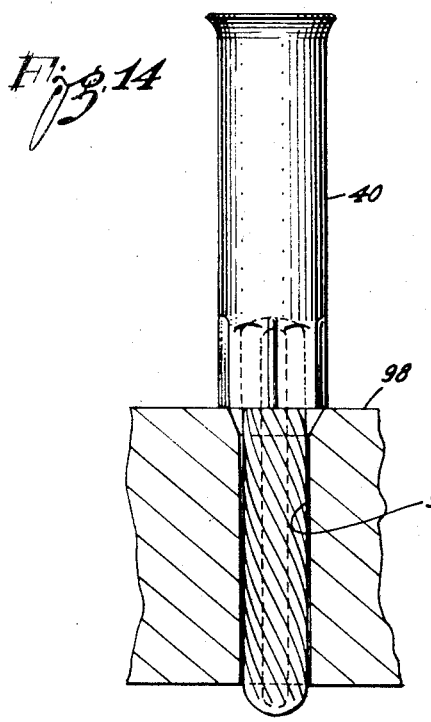
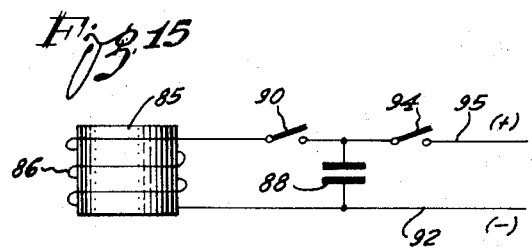
INVENTOR:
Delbert L. Phillips
Attorneys

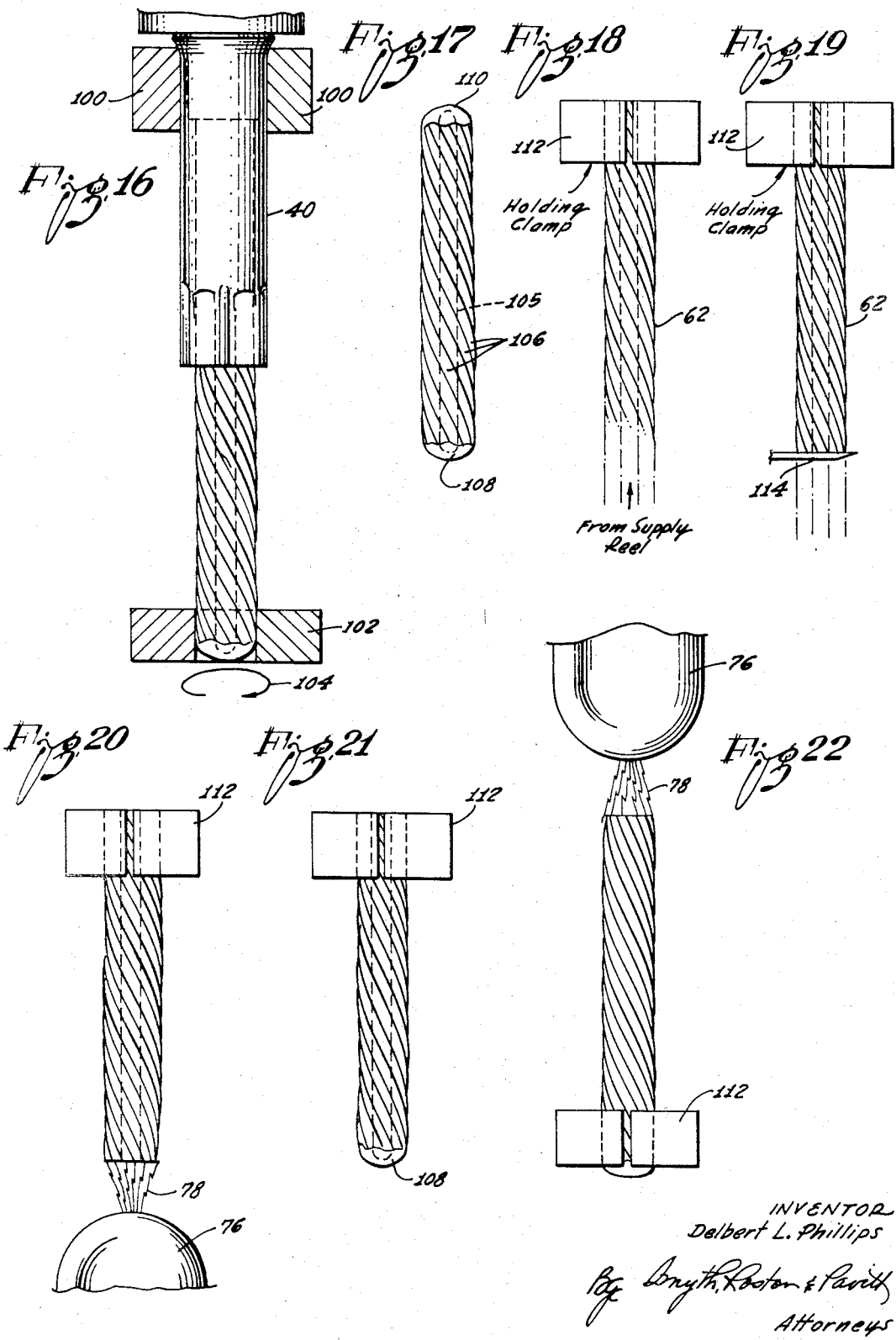

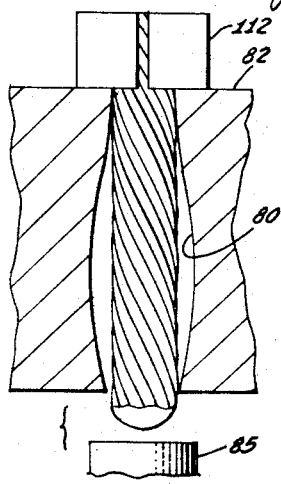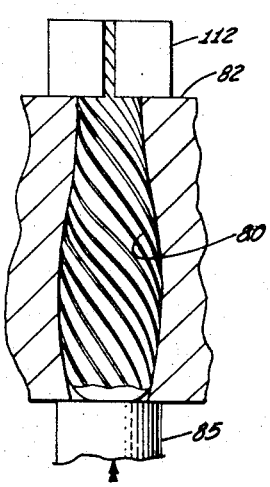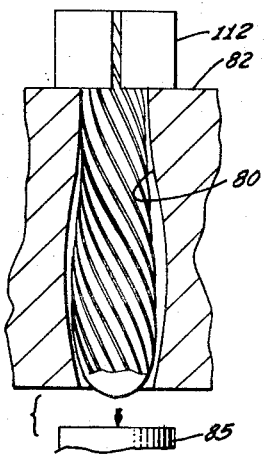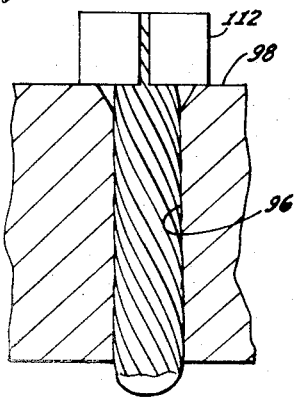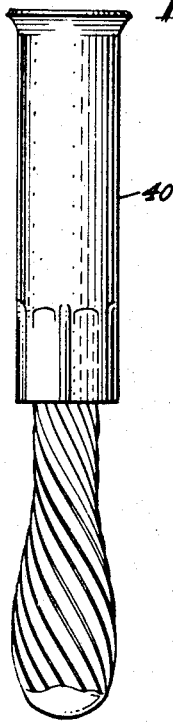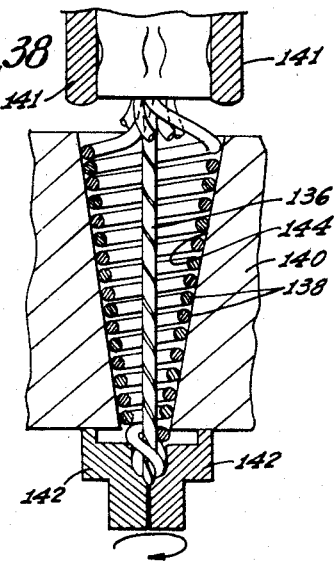

Sept. 24, 1968 D. L. PHILLIPS 3,402,466
METHOD OF FABRICATING SPIRALLY WOUND PIN CONNECTORS
Filed Dec. 7, 1964 10 Sheets-Sheet 6

INVENTOR:
Delbert L. Phillips

Attorneys

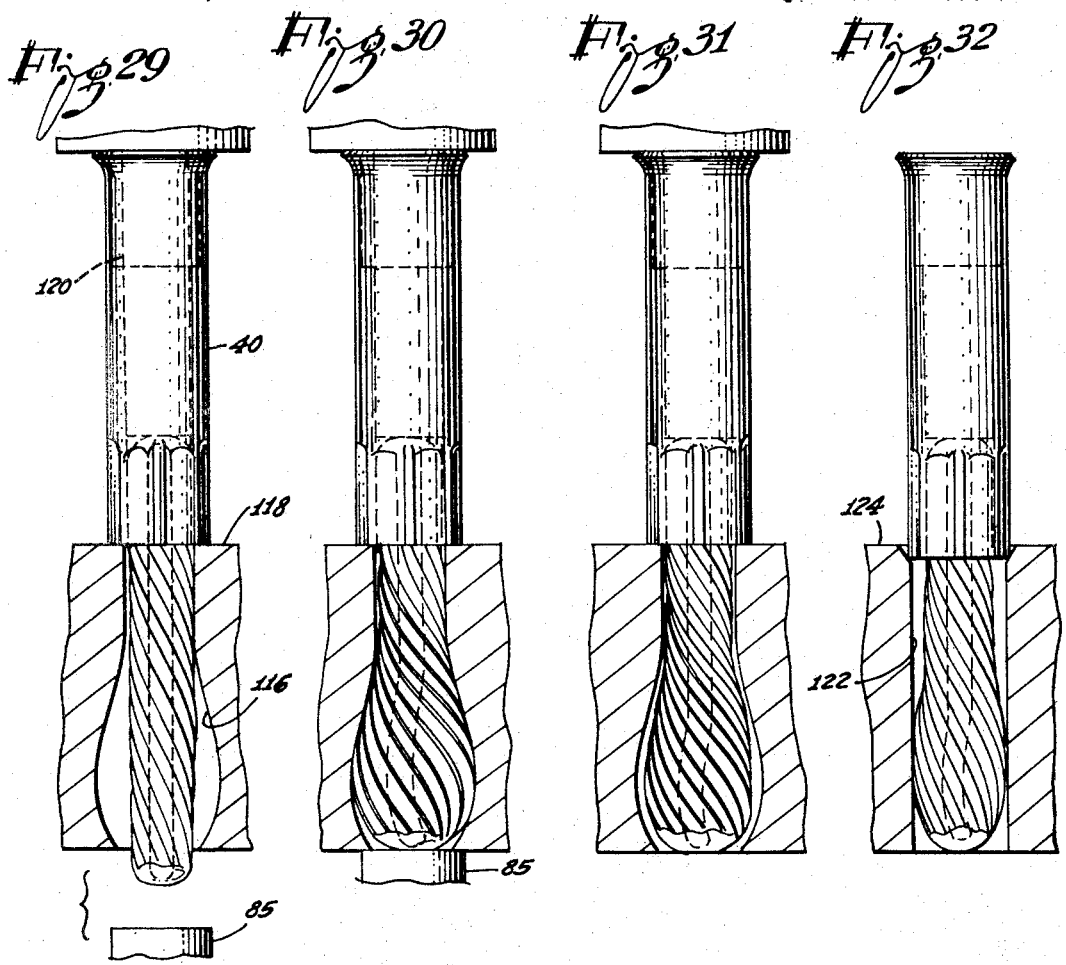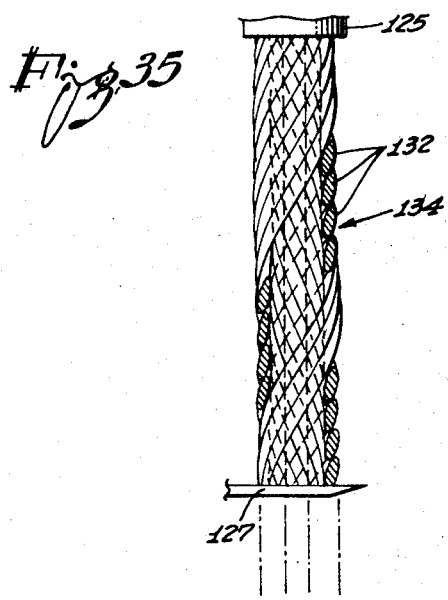

Sept. 24, 1968  D. L. PHILLIPS  3,402,466
METHOD OF FABRICATING SPIRALLY WOUND PIN CONNECTORS
Filed Dec. 7, 1964  10 Sheets-Sheet 8
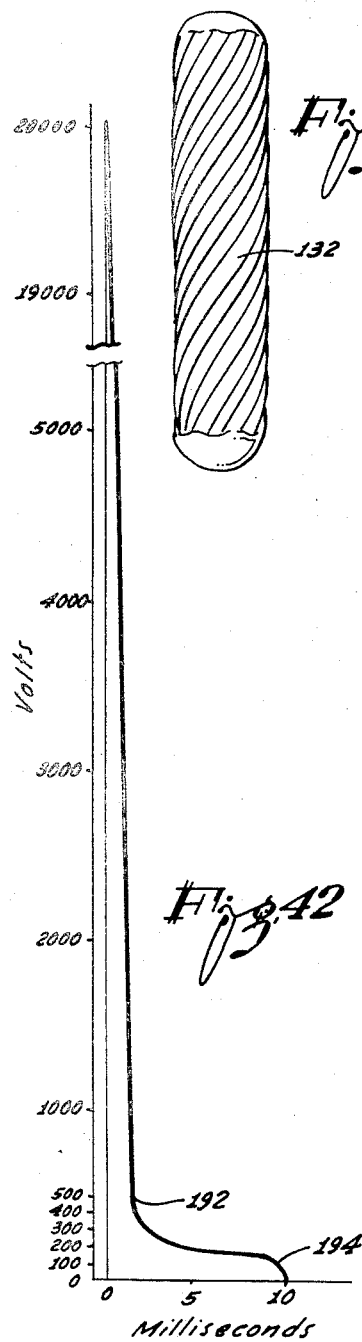
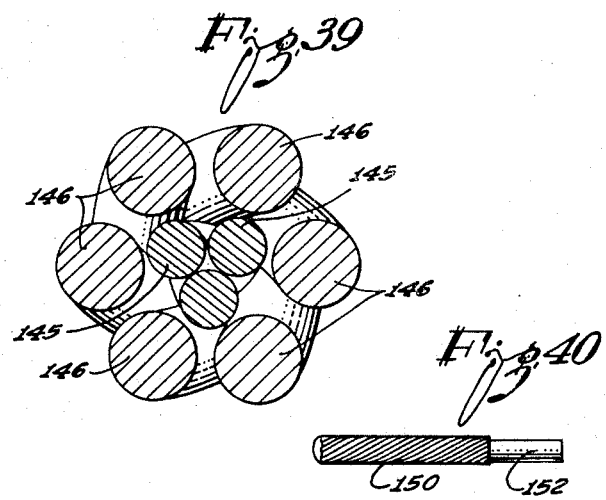
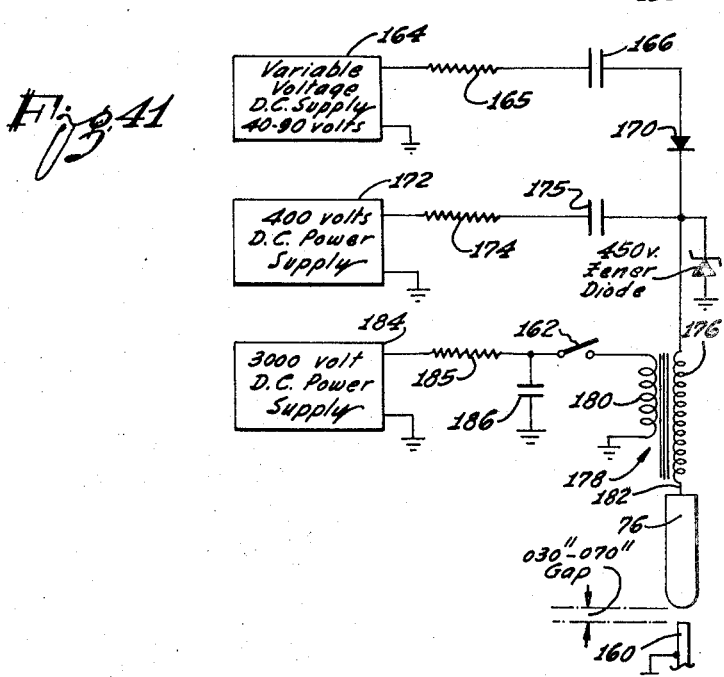
INVENTOR:
Delbert L. Phillips
By Smyth, Roston & Pavitt
Attorneys

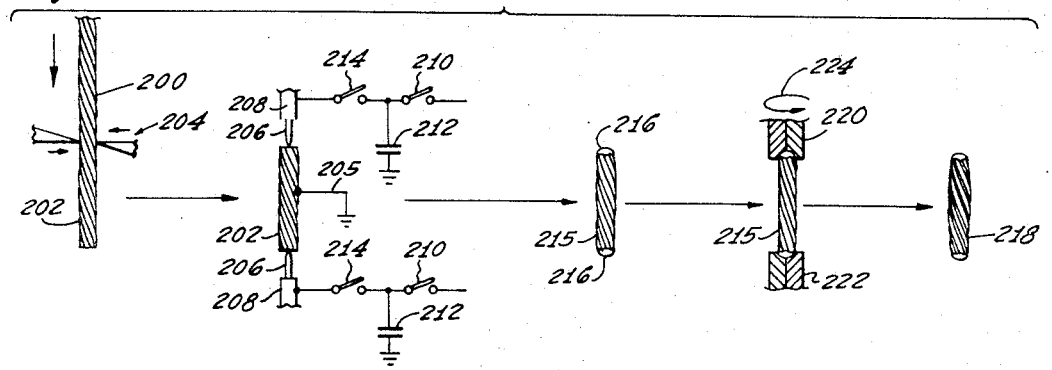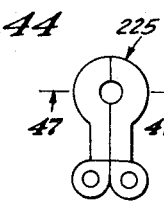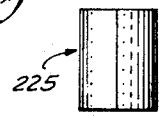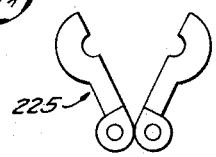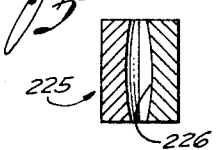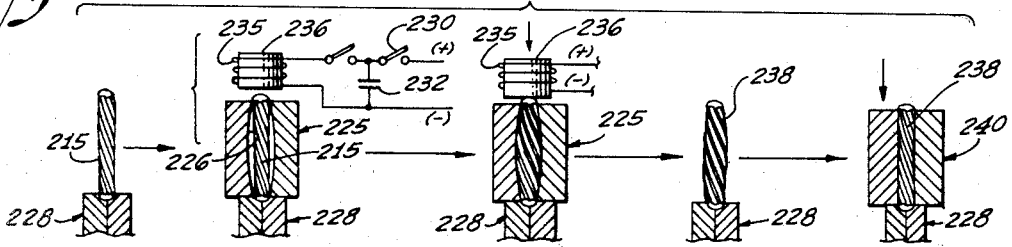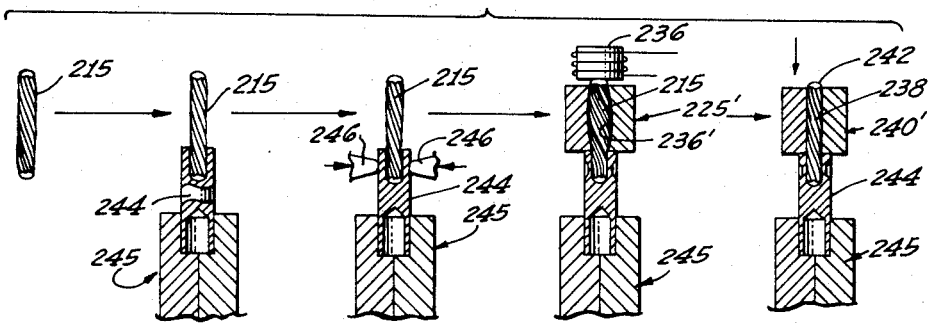

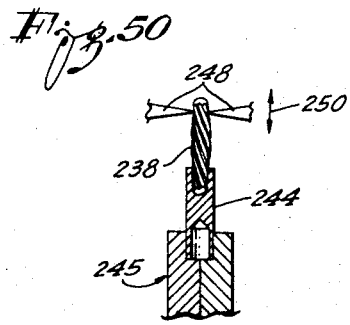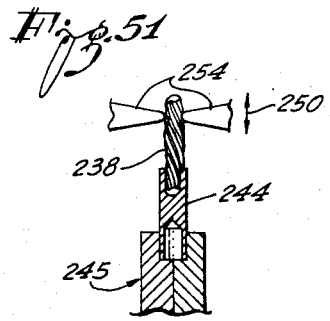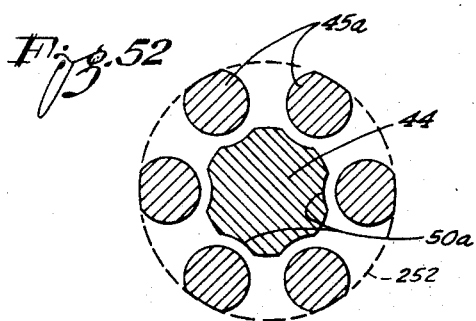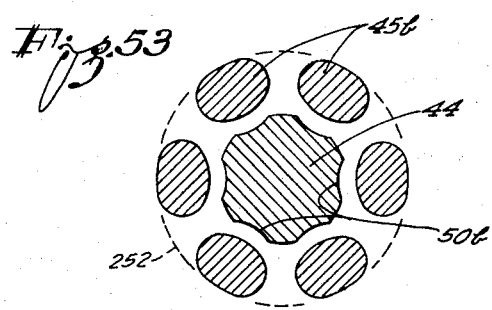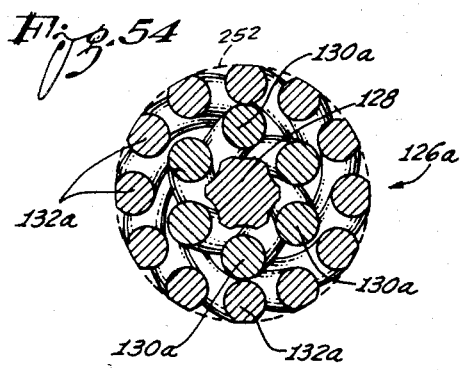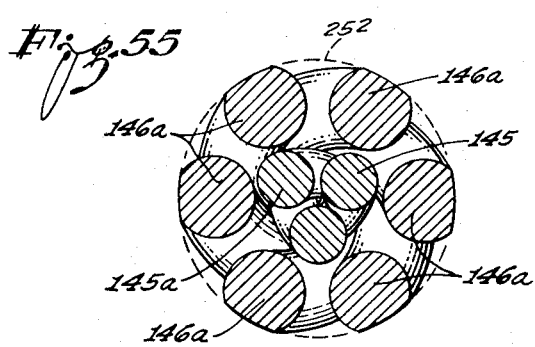

United States Patent Office 3,402,466
Patented Sept. 24, 1968

3,402,466
METHOD OF FABRICATING SPIRALLY WOUND PIN CONNECTORS
Delbert L. Phillips, Malibu, Calif., assignor to New Twist Connector Corporation, Santa Monica, Calif., a corporation of California
Continuation-in-part of application Ser. No. 161,198, Dec. 21, 1961. This application Dec. 7, 1964, Ser. No. 416,528
27 Claims. (Cl. 29—629)

ABSTRACT OF THE DISCLOSURE

The steps to fabricate a pin element to cooperate with a socket element for an electrical connection include: (1) winding a plurality of wires helically around a core wire to form a twisted wire cable; (2) severing a short portion of the cable; (3) applying electric arcs to the opposite ends of the short portions to fuse the helical wires to the core and thereby forming a pin element with rounded noses on its opposite ends; (4) subjecting the axial core of the pin element to axial force to permanently bow the helical wires outward; and (5) abrading or burnishing the outwardly bowed wires to give their outer surface the inside curvature of the socket element.

---

This invention relates to releasable connectors for electric circuits and, more particularly, relates to a pin connector having a pin element to fit retractably into a cooperating socket connector. This application is a continuation-in-part of my copending application Ser. No. 161,198 filed Dec. 21, 1961, entitled, "Method of Fabricating Spirally Wound Pin Connectors," now abandoned, which in turn is a continuation-in-part of my application Ser. No. 808,783 filed Apr. 24, 1959, entitled, "Plug Connector," now abandoned.

The invention meets the need for a pin connector that is highly efficient and reliable for its purpose over a long service life and at the same time is of simple, inexpensive construction suitable for mass production. The pin connector of the present invention may be produced entirely by automatic machinery at a total labor and material cost that is exceedingly low.

The invention also meets the need for a pin connector having a pin element that is resiliently contractible in cross-sectional dimension throughout its length or at least a major portion of its length. Such a pin element is highly advantageous for a number of reasons.

In the first place, a resiliently contractible pin element may be oversized relative to the cooperating socket connector so that the pin element is forcibly contracted by the socket connector to assure adequate frictional engagement between the two connectors. In the second place, such a construction permits a liberal range of tolerances in the dimensioning of a pin element to fit into a socket connector of a given size and, conversely, permits tolerances in the dimensioning of the socket connector. In the third place, a pin element that is resiliently contracted by the cooperating socket connector has high resistance to vibration. In the fourth place an extensive longitudinal portion of the pin element makes pressure contact with a cooperating socket to minimize contact resistance at the connection.

A fifth advantage is that such a resiliently contractible pin element does not depend on spring action by the cooperating socket connector to make an effective electrical connection. A sixth advantage is that using such a resiliently contractible pin element cooperating with a socket connector that is yieldingly expandible provides a combination of two yielding means with two different natural frequencies of vibration so that only one of the two yielding means can be in resonance with an imposed vibratory frequency at one time, the other yielding means being out of resonance to maintain the effectiveness of the electrical joint.

The invention further meets a certain troublesome problem that arises from two facts. The first fact is that conventional pin elements commonly deteriorate badly with respect to resistance to withdrawal from the cooperating socket connectors and especially so when electrical connections are repeatedly made and broken. Because of this fact effective withdrawal resistance after a period of use can be assured only by starting with a high initial resistance to withdrawal. The second fact is that it is difficult to manufacture pin elements in large quantities to fall within a narrow range with respect to the magnitude of resistance to withdrawal of the pin elements from cooperating socket connectors.

Because of these facts, it has been necessary heretofore to accept an unduly high initial resistance to withdrawal and to accept a wide range of initial resistance. In too many instances the initial resistance afforded by a new pin element is very high in the liberal range. In practice, if a certain given minimum magnitude of resistance to withdrawal is required for a given installation, a much higher magnitude than the required minimum must be accepted. In many instances, such a wide range of withdrawal resistances creates difficulties. For example an unbilical cord for readying a missile for launching commonly incorporates a large number of pin elements and cooperating socket connectors and the total resistance to withdrawal of the large number of pin elements may be seriously excessive.

In contrast, the present invention provides a pin element that offers resistance to withdrawal within only a narrow range of tolerances. The pin element may be depended upon to maintain substantially the same magnitude of resistance to withdrawal after repeated usage over a long service period.

Broadly described, the pin element comprises a longitudinal core of at least one wire with a cluster of longitudinal resiliently flexible wires surrounding the core and bowed outwardly from the core, the cluster being oversized in overall cross-sectional dimension relative to the cooperating socket connector. The opposite ends of the wires of the cluster are fixedly connected with the core and the intermediate portions of the wires of the cluster are spaced radially outward from the core to permit the desired resilient radial contraction of the cluster by a cooperating socket connector. In the preferred practice of the invention the wires of the cluster are of helical configuration.

The character of the pin element may be understood when it is considered that if a wire of a given length is formed into a uniform helix of a given diameter between two points of a given distance apart, the wire will form a given number of helix turns. The diameter of the turns may be decreased either by increasing the distance between the two points or by increasing the number of turns. Conversely, if the helical turns are radially contracted by forcing the helix into a restricting socket and the distance between the two points remains fixed, the helical wire must increase its number of helical turns or achieve the same effect by distortion of the helical turns out of the uniform helical configuration, the distortion being both in flexure and in torque. It is the resilient resistance of the helical cluster wires to this distortion by a restricting connector socket that creates the highly effective frictional engagement of the pin element with the cooperating socket connector. Since the cluster comprises several helical wires they interfere with each others' freedom to flex and thus increase the frictional engagement.

There is also the fact that the forcing of an oversized pin element into a socket displaces the helical turns of the cluster wires towards the base of the pin element. Consequently the bowing of the helical wires at the base portion is increased to provide added spring pressure that increases the frictional engagement of the pin element with the cooperating socket connector.

In some practices of the invention a second set of helical wires is added to the cluster to give the pin element a relatively large diameter. The second set is an outer set that surrounds an inner set of helical wires and is anchored in the same manner to the opposite ends of the axial core wire. Preferably the two sets of wires of the cluster are helical and are wound in opposite directions.

A feature of the invention is that the pin connector may comprise solely a pin element with both of its ends adapted for insertion into two corresponding sockets. As will be explained, such a pin connector may be used for circuit connections in the general manner of a dowel without the necessity of applying solder. A plurality of such double-ended pin elements may be used to electrically interconnect two printed circuit panels with the panels positioned face to face, or with the panels positioned edge to edge in the same plane, or with one panel at 90° relative to the other.

The invention has special utility for mounting electrical components on a printed circuit panel or on a breadboard because the spring-like cluster wires are so effective for frictionally engaging cooperative sockets. By simply plugging in pin elements, connections may be made and tested without stopping to solder or otherwise process the connections. Such connections may serve as reliable permanent connections. Thus the invention makes it possible to break electrical connections with a printed circuit board by simply withdrawing the resilient pin elements from the cooperating sockets. The components plugged into a panel in this manner are conveniently interchangeable and may be quickly and conveniently replaced when desired.

The features and advantages of the invention may be understood from the following description and the accompanying drawings.

In the drawings, which are to be regarded as merely illustrative:

FIG. 1 is a side elevation of a pin connector embodying the invention;

FIG. 2 is a transverse section along the line 2—2 of FIG. 1 showing how the intermediate portions of the helical wires of the cluster are normally spaced radially outward from the core wire;

FIG. 3 is a diagrammatic perspective view showing how a strand comprising a core and a helically wound cluster of wires may be formed for the purpose of fabricating pin elements;

FIG. 4 is a transverse section along the line 4—4 of FIG. 3 showing how the helical wires of the cluster may be initially crowded against the core in the fabrication of the strand;

FIG. 5 is a side elevational view with parts broken away showing a first step in using the strand of wires to form a pin element, which step consists of inserting the end of the strand into a ferrule;

FIG. 6 is a side elevational view showing the next step of crimping the ferrule into permanent engagement with the strand;

FIG. 7 is a transverse section along the line 7—7 of FIG. 6 showing how the ferrule is crimped into engagement with the strand;

FIG. 8 is a view similar to FIG. 6 illustrating the next step of severing the strand to leave a small length of the strand connected to the ferrule;

FIG. 9 is a view similar to FIG. 8 illustrating the next step of applying an electric arc to the end of the severed strand to form a rounded nose for the pin element;

FIG. 10 is a view similar to FIG. 9 showing the rounded nose produced by the arc;

FIG. 11 is a view partly in side elevation and partly in section showing the next step of inserting the unfinished pin element into a forming cavity;

FIG. 12 is a similar view illustrating the next step of applying an impact force against the end of the unfinished pin element to cause radial expansion of the pin element;

FIG. 13 is a view similar to FIG. 12 showing the configuration of the unfinished pin element after the application of the impact force;

FIG. 14 is a view similar to FIG. 13 showing the final step of inserting the expanded pin element into a sizing bore to reduce the cross section of the pin element to the desired final dimension;

FIG. 15 is a diagrammatic view showing how a voice coil may be used to apply the impact force in FIG. 12;

FIG. 16 is a view partly in side elevation and partly in section showing an alternate method of radially expanding the unfinished pin element by twisting the pin element in the unwinding direction;

FIG. 17 is a side elevation of a pin connector in the form of a simple pin element, the opposite ends of which may be inserted into cooperative socket connectors;

FIG. 18 is a side elevational view illustrating the first step in forming the pin element of FIG. 17 which first step consists in gripping the end of the strand of wires by a holding clamp;

FIG. 19 is a similar view illustrating the second step of severing the strand of wires to leave a suitable length engaged by the holding clamp;

FIG. 20 is a similar view illustrating the next step of applying an arc to the free end of the severed length of strand;

FIG. 21 is a similar view showing the rounded nose formed by the arc;

FIG. 22 is a side elevational view of the next step which consists in shifting the holding clamp to the opposite end of the unfinished pin element and applying an electric arc to form a second nose;

FIG. 23 is a view partly in side elevation and partly in section showing how the next step may consist of placing the unfinished pin element in a forming cavity;

FIG. 24 is a similar view showing how impact force is applied to the end of the unfinished pin element to expand the unfinished pin element to the configuration of the cavity;

FIG. 25 is a similar view showing the configuration of the unfinished pin element after the application of the impact force;

FIG. 26 is a similar view showing the final step of inserting the unfinished pin element into a sizing bore to reduce the cross section of the pin element to the desired final cross section;

FIG. 28 is a side elevation of a pin connector having a pin element of a bulbous configuration to fit into a cooperating socket with a snap action;

FIG. 29 is a view partly in side elevation and partly in section showing how an unfinished pin element may be placed in a bulbous cavity in preparation for forming the pin element to a bulbous configuration;

FIG. 30 is a similar view showing how an impact force may be applied to the end of the unfinished pin element to expand it radially to a bulbous configuration;

FIG 31 is a simliar view showing how the pin element contracts radially after the impact force;

FIG. 32 is a similar view showing how the unfinished pin element may be inserted into a sizing bore to reduce the bulbous configuration to the desired final cross-sectional configuration;

FIG. 35 is a view partly in side elevation and partly in section indicating the character of the strand that is used to fabricate the pin element of FIG. 33, the end of the strand being secured in a ferrule in preparation for cutting off the desired length of the strand;

FIG. 36 is a side elevation of a simple double-ended pin connector in the form of a pin element of the same character as the pin element in FIG. 17 with an outer set of helical wires added to increase the diameter of the pin element;

FIG. 38 is a view partly in section and partly in side elevation showing a step in the production of the tapered pin element of FIG. 37 wherein the unfinished tapered pin element is radially expanded by a twisting action in an unwinding direction while the unfinished pin element is in a tapered forming cavity;

FIG. 39 is a transverse section of a pin element in which the core comprises three wires twisted together instead of a single wire;

FIG. 40 is a side elevational view on a reduced scale of a pin connector having a shank in the form of a solid wire;

FIG. 41 is a wiring diagram of an apparatus for producing a pulse of current to create an arc for welding the ends of the wires of the pin element and for simultaneously forming the rounded nose;

FIG. 42 is a graph of a pulse of current produced by the apparatus of FIG. 41;

FIG. 43 is a schematic view illustrating the successive steps of a method of fabricating a pin element in which the final step is an untwisting operation to expand the pin element radially;

Figure 27:
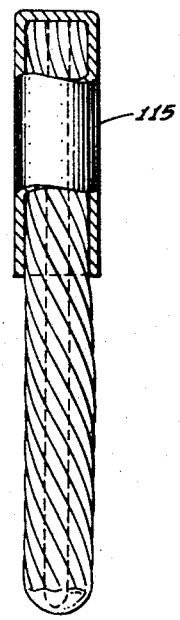
FIG. 27 is a view partly of side elevation and partly in section showing how the pin element of FIG. 17 may be provided with an end casing cap on one end.

FIGS. 44 to 47 are views of a pair of jaws that form a cavity that may be used for the final step of expanding the pin element by endwise impact instead of untwisting the pin element, FIG. 44 being a plan view of the pair of jaws in closed position, FIG. 45 being a front elevational view of the jaws in closed position, FIG. 46 being a plan view of the jaws in open position, FIG. 47 being a section along the line 47—47 of FIG. 44;

FIG. 48 is a diagrammatic view indicating successive steps for finishing a pin element including steps employing the pair of jaws shown in FIGS. 44–47;

FIG. 49 is a diagrammatic view indicating a series of steps for finishing a pin connector which comprises a pin element mounted in a ferrule;

FIG. 50 is a diagrammatic view illustrating a step of abrading a pin element to provide a greater area of contact between the pin element and a socket in which the pin element is to be inserted;

FIG. 51 is a diagrammatic view illustrating a burnishing operation that may be performed for the same purpose; and FIGS. 52 to 55 are cross sections on an enlarged scale of pin elements that have been processed either in the manner shown in FIG. 50 or in the manner shown in FIG. 51.

The first embodiment of the pin connector shown in FIG. 1 includes a base member in the form of a ferrule 40 and a multiple wire pin element mounted therein, the ferrule being anchored onto the end of a wire 42. The ferrule is anchored to the insulated wire by solder but may be crimped to the wire instead. As indicated in FIGS. 1 and 2 the pin element of the pin connector comprises an axial core wire 44 and a cluster of helically formed wires 45 surrounding the core wire.

It is contemplated that the two ends of the helical wires 45 of the cluster will be fixedly connected with the corresponding ends of the core wire 44. In this particular embodiment of the invention the ferrule 40 is crimped inward as indicated at 46 to grip the cluster of wires 45 so that the ferrule serves the purpose of fixedly connecting the inner ends of the helical wires 45 and the outer end of the core wire 44 are bonded together by employing an arc of brief duration which forms a smooth rounded nose 48 on the leading end of the pin portion.

In the preferred practice of the invention the core wire 44 is made of highly conductive material and soft copper is preferred for this purpose. On the other hand, it is contemplated that the helical wires 45 will be of resilient or spring-like construction. For this purpose, the helical wires 45 may be made of beryllium copper that is three-fourths hard.

As indicated in FIG. 2 the helical wires 45 at their intermediate portions are spaced radially outward from the core wire 44 to permit the pin element of the pin connector to be yieldingly contracted radially by the cooperating socket connector into which it is inserted. FIG. 2 further shows how the core wire 44 may have shallow recesses or indentations 50 on its peripheral surface conforming to the helical wires 45 to provide additional clearance for radially inward flexure of the helical wires. The indentations 50 may be omitted.

The unrestrained cross-sectional dimension of the cluster of outwardly flexed helical wires 45, i.e. the cross-sectional dimension of the cluster before the pin element connector is inserted into a socket connector, is greater than the internal cross-sectional dimension of the cooperating socket connector. Consequently, insertion of the pin element into the cooperating socket connector causes the pin element to be radially and resiliently contracted, the intermediate portions of the helical wires 45 being flexed inward towards the core wire 44.

The described pin elements shown in FIGS. 1 and 2 may be fabricated by a method illustrated by FIGS. 3–15.

FIG. 3 shows diagrammatically how a strand of wires may be fabricated for the mass production of the pin elements. In FIG. 3, a core 52 comprising a single wire is unwound from a spool 54 and is drawn through the aperture of a sizing die 55 in a plate 56. A plurality of spools 58 carrying a corresponding plurality of cluster wires 60 is rotated in an orbit about the axis of the core 52. The resulting helical wrapping of the cluster wires 60 around the core 52 produces a strand 62 which strand is reduced in diameter to a predetermined dimension by the passage of the strand through the sizing die 55. In this instance the aperture of the sizing die 55 is small enough to force the cluster wires 60 into the material of the core wire 52, as indicated in FIG. 4 to form the previously mentioned indentations 50, but, as heretofore indicated, the aperture of the sizing die need not be so small as to cause indentations to be formed.

The strand 62 passes under a guide sheave 64 and passes between two cooperating belts 65 that are mounted on rollers 66. The purpose of the two co-acting belts 65 is to grip the strand 62 with sufficient effectiveness to pull the strand through the sizing die 55. The processed strand is then wound on a large spool 70.

To fabricate a pin connector of the character shown in FIG. 1, the end of a strand 62 from a suitable supply reel is inserted into a ferrule 40 in the manner indicated in FIG. 5. A pair of crimping jaws 72 of the character shown in FIGS. 6 and 7 is then applied to the ferrule 40 to crimp the ferrule into tight engagement with the enclosed end of the strand, the cross section of the crimped portion being shown in FIG. 7. With the crimping jaws 72 still gripping the ferrule 40, the strand 62 is then severed by suitable means 74 shown in FIG. 8 to leave a desired length of the strand to serve as a pin element in the ferrule.

The next step is to apply a sufficient amount of heat briefly to the leading end of the unfinished pin element to weld all of the outer ends of the wires together and thereby form the previously mentioned solid nose 48 with the nose uniting the outer end of the core wire 44 and the outer ends of the cluster wires 45. An electric arc may be used that is hot enough to melt and fuse the ends of the wires but is of short enough duration to prevent excessive melting. For this purpose the unfinished pin element may be gripped by a pair of metal jaws 75 shown in FIG. 9 and the metal jaws may be placed in a welding circuit with an electrode 76. The circuit is then energized with a sharp high voltage pulse of current to create an arc 78 between the electrode 76 and the end of the unfinished pin element. An apparatus for carrying out this step may produce the arc 78 by discharging suitable capacitor means, as will be described later.

For many installations it is desirable that all of the surfaces of the pin element be plated with a metal that has high resistance to oxidation and corrosion. For this purpose the core wire 44 and the cluster wires 45 may be plated, for example, plated with gold, before the strand 62 is formed by the apparatus shown in FIG. 3. The heat of the arc 78 destroys the gold plating and, of course, the metal of the round nose 48 of the pin element is not protected by the metal plate. A feature of the invention, however, is that a piece of gold wire may be substituted for the electrode 76 for the purpose of striking the arc 78 to form the nose 48.

It has been found that the use of a gold wire for the electrode results in transfer of gold from the wire by the arc to the leading end of the pin element. The result is that the leading end of the pin element is formed with a gold plate which together with the original plating of the core wire and the cluster wires provides uninterrupted gold plating for full protection of the pin fitting. The depth of the gold plating may be varied by varying the diameter of the gold wire. One important advantage of this procedure is that the gold plating added by the arc 78 is fused or metallurgically bonded to the base metal of the pin element in an integral manner. In contrast, ordinary gold plating is merely a deposited layer of gold that is not fused to the base metal.

The next step is to stress the pin element of the pin connector beyond its elastic limit to loosen the cluster wires from the core for radial expansion of the pin element. In the preferred practice of the invention the core is shortened by endwise impact force to cause the radial expansion. For this purpose the pin element or pin portion of the unfinished pin connector may be extended through a forming cavity or passage 80 that is open at both ends. As shown in FIG. 11 the cavity 80 is formed in a metal block 82 and the rim of the leading end of the ferrule 40 is positioned to abut the metal block. To keep the pin portion of the connector pin from being displaced axially into the ferrule 40, a suitable mandrel 84 is inserted into the ferrule into abutment with the inner ends of the wires that form the pin portions of the connector.

With the leading end of the pin element of the connector extending beyond the second end of the cavity 80, a suitable impact member 85 is caused to strike the leading end of the pin element in a manner illustrated by FIGS. 11 and 12. The impact force may be electrically generated, but it has been found that a solenoid of conventional type operates more slowly than is desirable for this purpose. In this regard, a feature of the invention is the concept of using for this purpose a voice coil of the type that is commonly employed in loudspeakers to accelerate an impact member of low mass to a high velocity. For close control of the impact force, the voice coil may be energized by discharging suitable capacitor means, the magnitude of the impact force depending on the size of the charge on the capacitor means.

FIG. 15 shows diagrammatically how an exceedingly light impact member 85 may be positioned inside a voice coil 86 that has a large number of turns. The voice coil 86 is in series with a capacitor 88 and a normally open switch 90. One side of the capacitor 88 is connected to a suitable direct current source by a wire 92. The second side of the capacitor 88 is connected to the direct current source by a normally open switch 94 and a wire 95. With the switch 90 open, the switch 94 is closed to charge the capacitor 88. The switch 94 is then opened and the switch 90 is closed to cause the capacitor to discharge through the voice coil 86.

The impact of the impact member 85 against the leading end of the unfinished pin element stresses the unfinished pin element beyond its elastic limit to shorten the pin element with corresponding permanent reduction in the effective length of the core and corresponding expansion of the cluster of helical wires 45 outward to conform to the configuration of the cavity 80. The degree to which the pin element is shortened by the impact force does not vary with the length of the pin element. The shortening of the pin element may be by permanent flexure of the core or permanent axial compression of the core or by both effects. After the impact, the radially expanded pin element of the pin connector contracts slightly radially to the configuration shown in FIG. 13. This configuration is larger in cross section than the desired final cross-sectional dimension of the pin element. The next step is to contract the pin radially by forcing the pin end of the pin element into a sizing bore 96 in a block 98. Here again the pin element is stressed beyond its elastic limit so that when the pin element is withdrawn from the sizing orifice such as a bore 96 it expands slightly to a cross-sectional dimension that is somewhat larger than the cross section of the bore. The resulting cross-sectional dimension is the desired final cross-sectional dimension and, as heretofore indicated, this final cross-sectional dimension is somewhat larger than the cross section of the cooperating socket of the socket connector into which the pin element is to be inserted.

FIG. 16 shows an alternate step for reducing the length of the pin element for increasing its cross-sectional dimenson, this alternate step being substituted for the step illustrated by FIGS. 11 and 12. This alternate step consists in clamping the ferrule 40 by a pair of jaws 100, gripping the leading end of the unfinished pin element by a second pair of jaws 102 and then rotating the jaws 102 about the axis of the pin element with the jaws 102 free to shift axially towards the first jaws 100. As indicated by the circular arrow 104, the rotation of the jaws 102 relative to the jaws 100 is in a direction to unwind the helical wires 45.

Only a slight rotation of the jaws 102 relative to the jaws 100 is required to stress the pin element beyond its elastic limit to expand the pin element of the pin connector radially to the desired degree. Two effects occur simultaneously to flex the helical cluster wires 45 radially outward from the core wire 44. One effect is that the unwinding action of the helical wires 45 goes beyond the elastic limits of the helical wires to reduce the number of helical turns and thus cause the helical wires to flex radially outward from the core wire 44. The other effect is the shortening in length of the core wire 44 that is caused by twisting the core wire beyond its elastic limit about its axis. Only the unwinding effect may be significant in some instances, the shortening of the core being negligible. The end result however, is that the core is relatively short in the sense that a core of longer effective length would be required to permit the cluster, when unconfined, to assume a diameter as small as the inside diameter of the connector socket for which the pin element is designed.

When the rotary jaws 102 release the pin element there is a slight untwisting recovery of the pin element of the connection, but the net result is substantially radial increase in the cross-sectional dimension of the pin element. The expanded pin element of the connector may then be inserted into the sizing bore 96 as shown in FIG. 14 to reduce the cross-sectional dimension of the pin element to the desired final cross-sectional dimension.

FIG. 17 shows what may be termed a double-ended pin connector, the opposite ends of which may be inserted into cooperating connector sockets. This is the simplest form of the invention since no ferrule is used. The pin connector shown in FIG. 17 consists solely of a pin element in the form of an axial core wire 105 surrounded by a cluster of helical wires 106. At one end of the pin element the end of the core wire 105 and the corresponding ends of the helical wires 106 are united by a weld which forms a rounded nose 108. In like manner the opposite end of the core wire 105 and the opposite ends of the helical wires 106 are united by a weld that forms a second rounded nose 110.

The simple double-ended pin connector of FIG. 17 may be fabricated by a procedure which includes the steps shown in FIGS. 18–26. The first step illustrated in FIG. 18 is to grip one end of the previously described strand 62 by a holding clamp 112. The next step is to cut the strand 62 to length by suitable severing means 114 shown in FIG. 19 to form an unfinished pin element. FIG. 20 shows how the holding clamp 112 may be placed in a welding circuit with the previously mentioned electrode 76 for the creation of an arc 78 at the leading end of the pin element, which arc forms the nose 108 as shown in FIG. 21. The electrode 76 may be made of gold to form the nose 108 with a gold surface. The holding clamp 112 is then shifted to the other end of the unfinished pin element as shown in FIG. 22, and the holding clamp is again placed in a circuit with the electrode 76 to create an arc 78 to form the second nose 110 of the pin element.

The unfinished pin element may be radially expanded either by endwise impact or by untwisting action as previously explained. FIG. 23 shows how with the unfinished pin element held at one end by a holding clamp 112, the unfinished pin element may be inserted through the previously mentioned forming cavity 80 and the metal block 82. FIGS. 23 and 24 show how an impact member 85 may be used to strike the end of the unfinished pin element in the manner heretofore described to cause the unfinished pin element to expand radially to the configuration shown in FIG. 25. The holding clamp 112 is then employed as shown in FIG. 26, to force the radially expanded pin element into the previously mentioned sizing bore 96 in the block 98 to reduce the pin element to the desired final cross-sectional dimension.

FIG. 27 shows how the simple connector pin element shown in FIG. 17 may be provided with an encasing cap or ferrule 115 at one of its ends. The ferrule 115 may be crimped into engagement with the end of the pin element or may be soldered to the pin element or may be otherwise bonded to the pin element. The encasing cap or ferrule 115 makes it unnecessary to weld together the inner ends of the wires. The cap or ferrule 115 may be permanently secured in a bore in a panel, for example by deformation after it is inserted into the bore. It is apparent that the pin connector shown in FIG. 27 may be fabricated by the previously described procedure illustrated by FIGS. 3–15.

FIG. 28 shows a pin connector having a ferrule 40 and a pin element of bulbous configuration. Such a bulbous pin element may be forced into a cooperating socket member having a somewhat restricted entrance so that the bulbous portion of the pin element engages the socket with a snap action for highly effective engagement with the socket. The initial steps for forming the pin fitting shown in FIG. 28 are the steps illustrated by FIGS. 1–9, these steps producing the unfinished pin connector shown in FIG. 10. The unfinished pin connector of FIG. 10 is then processed in the manner illustrated by FIGS. 29–32.

FIG. 29 shows how the unfinished pin element of the pin connector of FIG. 10 may be inserted into a forming cavity 116 in a metal block 118, the forming cavity being of the desired bulbous configuration. With a mandrel 120 inserted into the ferrule 40 in abutment against the inner ends of the wires of the pin element, the previously mentioned impact member 85 is energized to strike the end of the unfinished pin element in the manner shown in FIG. 30 to cause the pin portion of the pin element to be expanded radially to the configuration of the bulbous cavity 118. FIG. 30 illustrates the fact that the impact force may shorten the unfinished pin element at least in part by bowing the core.

After the impact force, the pin element of the pin connector recovers to the less pronounced bulbous configuration shown in FIG. 31. Then, as shown in FIG. 32, the radially expanded pin element of the connector is forced into a sizing bore 122 in a metal block 124 for reduction to the desired final cross-sectional dimension.

Figure 33:
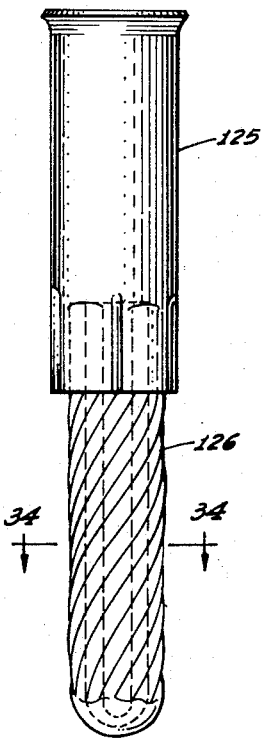
FIG. 33 is a side elevational view of a pin connector wherein an outer set of helical wires is applied to a pin element of the character shown in FIG. 1 to increase the diameter of the pin element, the ends of the outer helical wires being bonded to the end of the axial core in the same manner as the inner helical wires.
Figure 34:
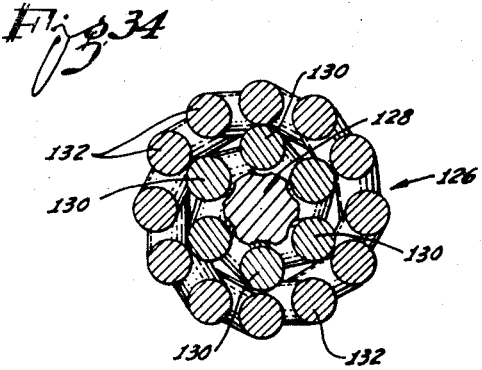
FIG. 34 is a transverse section along the line 34—34 of FIG. 33 showing the two sets of helical wires of the pin element.

FIG. 33 shows a pin connector comprising a ferrule 125 and a pin element 126 in which the construction is similar to the construction of the pin connector in FIG. 1 except that the pin element 126 has a second outer set of helically formed wires. Thus as shown in FIG. 34, the pin element 126 has a core wire 128 surrounded by a cluster of wires comprising an inner set of helical wires 130 and an outer set of helical wires 132. In the construction shown, the two sets of wires 130 and 132 are wound in opposite helical directions. All of the spiral wires of the two sets are biased radially outward from the core wire 128.

One advantage of adding a second outer set of helical wires is of course, the increase in the diameter of the pin element for installations where increased diameter is desirable. A more important advantage is that using two sets of relatively fine helical wires to provide a pin element of a given diameter instead of using a single set of coarser helical wires is that the pin element may be bent and rebent with relatively little damage and weakening of the helical wires. This fact may be appreciated when it is considered that when two wires of different diameters are bent to a given radius the material of the wire of the smaller diameter is stressed to a lesser degree than the material of the wire of the larger diameter. Another advantage of using two sets of helical wires instead of one set, is that the two sets more effectively enclose the axial core wire. If only one set of helical wires is used in the construction of the pin element and the pin element is bent to a sharp angle, the core wire may protrude at the bend. If two sets of helical wires are used, the core wire will not protrude at a sharp bend.

A further advantage of using relatively fine outer helical wires either in a pin element with two sets of helical wires or in a pin element with a single set of helical wires is the increased area of mutual contact between the pin element and a surrounding socket into which the pin element is inserted. If the outer surface of a pin element is formed by six helical wires as shown in FIG. 2 and the pin element is inserted into a socket 1/16 inch deep, for example a bore in a printed circuit board that is 1/16 inch thick, the pin element will make contact with the socket along six spiral lines each somewhat longer than 1/16 inch. If twelve finer helical wires, as shown in FIG. 34 form the outer surface of a pin element of the same diameter, the total length of the lines of contact will be doubled to result in a highly effective electrical connection with exceedingly low contact resistance.

Another advantage of using a relatively large number of relatively fine helical wires to provide the outer surface of a connector pin element instead of a fewer number of coarser wires is greater tolerance in the dimension of the connector pin elements and the complementary sockets. To explain, the larger number of relatively fine helical wires results in a greater range of radial contraction and expansion of the pin element to permit the pin element to cooperate effectively with sockets of a corresponding wide range of diameters, and especially so when the cluster of wires consists of two sets of oppositely wound helical wires. It is apparent that a double thickness pin element having two sets of oppositely wound helical wires has special utility where a wide range of dimensions must be tolerated and where extreme flexibility is required.

The process for fabricating the pin connector shown in FIG. 33 starts with the procedure illustrated by FIG. 3 which produces the previously mentioned strand 62. The spool 70 carrying the strand 62 is then substituted for the spool 54 in FIG. 3 and the procedure is repeated using a sizing die with a larger aperture than the sizing die 55. The number of spools 58 is increased in accord with the number of wires required in the outer helical set of cluster wires. The result of adding additional helical wires to the strand 62 is to produce the strand 134 shown in FIG. 35 which is of the cross section shown in FIG. 34, the surface of the strand being formed by the outer set of helical wires 132.

The further steps to fabricate the pin connector shown in FIG. 33 are the same as the previously described steps illustrated by FIGS. 5–14. FIG. 35 shows how in the course of this procedure the end of the strand 134 is anchored in a ferrule 125 and then the strand is cut to length by a severing means 127.

FIG. 36 shows a simple double-ended pin element which is like the previously described pin element shown in FIG. 17 but is made from the strand 134 and therefore has an additional outer set of helical wires 132. The opposite ends of the outer helical wires 132 are welded both to the opposite ends of the inner set of helical wires 130 and to the opposite ends of the axial core wire 128.

The method of fabricating the double-ended pin element shown in FIG. 36 may be readily understood. The strand 134 is processed in the manner indicated by the previously described double-ended pin element shown in FIG. 17.

Figure 37:
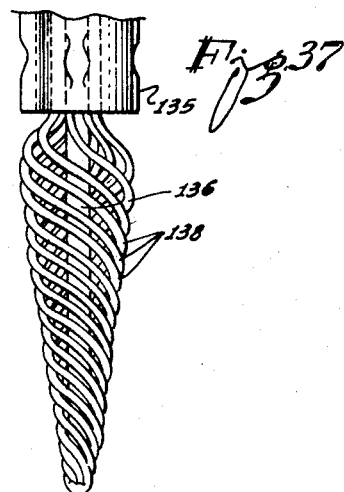
FIG. 37 is a side elevation of a pin connector having a tapered pin element.

FIG. 37 shows a pin connector having a ferrule 135, and a pin element comprising a core wire 136 and a cluster of helical wires 138 wherein the cluster is of tapered configuration. Such a tapered pin connector may be used with a cooperating socket of uniform cross section or may be used with a cooperating socket that is correspondingly tapered.

FIG. 38 shows how the pin element shown in FIG. 37 may be given the tapered configuration by a die member 140 and two pairs of jaws 141 and 142. With the cluster of wires 138 wound helically around the core wire 136 and with the cluster of wires fixed relative to the opposite ends of the core wire, the unfinished pin element has an initial configuration of substantially uniform cross section with all the cluster wires lying close to the core wire. The pin element completed to this stage is inserted through a tapered cavity 144 of the block 140 with the ferrule 135 gripped by the jaws 141 and the outer end of the pin connector gripped by the pair of jaws 142. The pair of jaws 142 which has freedom to shift towards the jaws 141 is then rotated about the axis of the core wire 136 in the direction to loosen or unwind the helical turns of the cluster wires 138. This action twists the core 136 with consequent reduction of the length of the core wire and at the same time the twisting action causes the cluster wires 138 to expand by unwinding action outward against the surrounding wall of the tapered conical cavity 144 to force the cluster wires to assume a corresponding tapered configuration. The block 140 may either be stationary or rotate in unison with the jaws 142 during this expansion operation. When the pin element is released by the jaws 142 it contracts to the configuration shown in FIG. 37.

In all of the embodiments of the invention described to this point the core consists of a single wire. It is to be understood, however, that the core may take any form and may comprise a plurality of wires. By way of example, FIG. 39 shows the cross section of a pin element which has a core comprising three twisted wires 145 and has the usual outer cluster of helical wires 146. In the construction shown the twist direction of the three core wires 145 is opposite to the helical direction of the outer cluster wires 146. The use of three relatively small core wires instead of a single relatively large core wire provides a pin element of increased flexibility. If desired, a second outer set of helical cluster wires may be added to embrace the helical wires 146 for the sake of the advantages heretofore discussed.

In the fabrication of a pin element of the construction shown in FIG. 39, there wires are first twisted together to form a core and then helical cluster wires are added to the core by the previously described operation shown in FIG. 3. The step of expanding the unfinished pin element may be either an impact step such as illustrated by FIGS. 11 and 12 or may be an untwisting step such as illustrated in FIG. 6. It has been found that core of a plurality of twisted copper wires responds to an impact force in substantially the same manner as a single core wire. If the untwisting operation is employed for radial expansion of the unfinished pin element, the fact that the helical direction of the outer wires is opposite to the twist of the core wires is helpful. The untwisting direction of the outer helical wires advantageously is in a rotary direction to increase the twist of the inner core wires. Thus the core is shortened because its twist is tightened and simultaneously the cluster of wires is expanded radially because the cluster is untwisted.

FIG. 40 shows how a pin element 150 such as the pin element shown in FIG. 17 or the pin element shown in FIG. 36 may be welded by resistance welding in end-to-end relationship to a metal shank member 152. The shank member 152 may be a piece of soft copper wire slightly smaller in diameter than the pin element. This connector pin may be mounted in a bore in a printed circuit board and may be permanently anchored in the bore in various ways. For example, intersecting bores may be provided for access to the installed shank member and may be mechanically deformed for anchorage. It is less expensive to provide a pin element with a soft copper shank member in this manner than to provide the pin element with the usual type of tubular ferrule.

FIG. 41 shows the essential circuits of an apparatus that may be employed to provide a sharp high voltage pulse of current to weld together the plurality of wires at the end of a pin connector and simultaneously form the rounded connector nose. FIG. 41 shows the previously mentioned electrode 76 and shows an unfinished pin element 160 spaced from the electrode by a gap of a magnitude on the order of .030–.070 inch. When a switch 162 is closed a pulse of current is released to create the desired arc between the electrode 76 and the pin element 160.

In FIG. 41 a voltage supply 164 that is adjustable in potential between 40 and 90 volts is grounded on one side and on the postive side is connected by a resistor 165 to one side of a capacitor 166. The second side of the capacitor 166 is connected to a conductor 168 through a diode 170 that prevents reverse flow of the current. A grounded 400 volt DC power supply 172 is connected through a resistor 174 to one side of a second capacitor 175 and the second side of the capacitor is connected to the conductor 168.

The conductor 168 is connected to the secondary coil 176 of a transformer 178 which steps up the voltage that is applied to the primary coil 180. The ratio of the turns of the secondary coil 176 to the turns of the primary coil 180 may be on the order of 40:1. The secondary coil 176 is connected to the electrode 76 by a conductor 182.

A grounded 3000 volt DC power supply 184 is connected by a resistor 185 with one side of the switch 162 and also to one side of a grounded capacitor 186. The switch 162 is connected to one end of the primary coil 180 of the transformer 178, the second end of the primary coil being grounded.

With the switch 162 open and with the gap existing between the electrode 76 and the pin element 160, the three capacitors 166, 175 and 186 are charged by the corresponding voltage sources, the condition of the circuits being static. When the switch 162 is closed to discharge the capacitor 186 through the primary coil 180, the transformer 178 functions in the manner of an automotive spark coil to create a high frequency pulse that establishes an arc across the gap from the electrode 76 to the pin connector 160. The arc provides a conductive path for discharge of the two capacitors 166 and 175 but the diode 170 prevents discharge of the capacitor 166 until the discharge from the capacitor 175 drops below the potential on the capacitor 166. To avoid any possibility of reverse flow from the secondary coil 176 damaging the two capacitors 166 and 175, a 450 volt Zener diode connects the conductor 168 to ground in the manner indicated in FIG. 41. In effect the Zener diode grounds the conductor 168 whenever the voltage of the conductor rises above 450 volts.

FIG. 42 shows graphically the character of the resulting pulse of current as sensed by connecting an oscilloscope to the conductor 182 adjacent the electrode 76. The discharge of the capacitor 186 through the primary coil of the transformer 178 produces the sharp voltage peak 190 which may be of a magnitude ranging between 20,000 and 80,000 volts. When the voltage drops below 400 volts at the point 192 in FIG. 42, the 400 volt DC power supply 172 discharges to prolong the pulse and then the variable DC voltage supply 164 discharges to form the terminal toe 194 of the pulse.

It is a simple matter to ascertain empirically the dimension of the gap at the electrode and the voltage setting of the supply 164 to form the desired round nose on the end of a pin element. The adjustment of the voltage supply 164 is determined largely by the mass of metal that is to be melted and the specific heat of the metal.

FIG. 43 illustrates diagrammatically a series of steps that may be followed for the mass production of pin elements by automatic machinery. A twisted strand 200 of multiple wires is employed which may be of any of the constructions heretofore described. The strand 200 is fed from a suitable supply reel (not shown) to a first station of an automatic machine where a short length 202 of the strand is measured and then is severed by a pair of blades 204. The short length of strand 202 is then displaced laterally from the path of advance of the supply strand 200 to the next station and is there connected to ground or to one side of a welding circuit as indicated at 205. At this second station electric arcs 206 are applied by electrodes 208 to the two opposite ends of the short length 202 in quick succession.

Any suitable welding circuit may be connected to each of the two electrodes but preferably each circuit includes a normally open switch 210 which may be closed to charge a capacitor 212 and second normally switch 214 which may be closed to discharge the capacitor for the purpose of creating an arc 206. The result of the application of the two arcs is an unfinished pin element 215 in which the ends of all of the wires of the pin element at the two opposite ends of the pin element are fused together to form rounded metal noses 216.

At the next station the unfinished pin element 215 is untwisted to a desired degree for radial expansion of the pin element to produce the finished pin element 218. The untwisting operation may be carried out in the manner heretofore described by gripping the opposite ends of the unfinished pin connector by two pairs of jaws 220 and 222 respectively and then rotating at least one of the jaws as indicated by the arrow 224.

In the presently preferred practice of the invention the last step of expanding the pin element radially is carried out by subjecting the pin to axial compression instead of untwisting the pin element. For this purpose a pair of jaws 225 may be employed of the character shown in FIGS. 44–47, each jaw forming one longitudinal half of a forming cavity 226. The advantage of employing a forming cavity that is formed by a pair of jaws instead of a forming cavity that is formed by a solid body of metal, is that the unfinished pin element may be moved laterally into the forming cavity instead of endwise, the lateral movement simplifying the production of the pin element by automatic machinery.

As indicated in FIG. 48 the first step in the radial expansion of an unfinished pin element 215 by endwise impact may be to grip one end of the unfinished pin element by a pair of jaws 228. At the next station the pair of jaws 228 carry the unfinished pin element 215 laterally into the open jaws 225 whereupon the jaws 225 close to confine the pin element in the forming cavity 226. To carry out the axial compression of the unfinished pin element 215, the previously described procedure may be carried out by closing a switch 230 to charge a capacitor 232 and then closing a second switch 234 to discharge the capacitor through a coil 235 for the purpose of electromagnetically driving an impact member 236 against the end of the confined unfinished pin element 215.

The result of the endwise compression of the unfinished pin element is to expand the pin element radially to the configuration of the forming cavity 226, the pin element being stressed beyond its elastic limits and then contracting slightly to a cross section less than the cross section of the forming cavity but substantially exceeding the cross section of the socket in which the pin is intended to be inserted. In the preferred practice of the invention the core of the pin element is made of soft copper and the outer cluster wires are made of relatively hard copper alloy as heretofore stated. The axial compression bends the soft copper core to length and bows the outer wires beyond their elastic limits to keep the core wire short. Preferably the expanded pin element 238 is carried by the pair of jaws 228 to an additional station where the expanded pin element is inserted into a sizing orifice of a sizing member 240 in the manner heretofore described, the sizing orifice reducing the cross-sectional dimension of the expanded pin element to the precise cross section required for cooperation with a socket of a given cross section.

FIG. 49 illustrates a satisfactory final series of steps for producing a pin connector that comprises a finished pin element 242 mounted in a ferrule 244. An unfinished pin element 215 is first inserted into a ferrule 244 that is carried by a pair of conveyor jaws 245 and suitable crimping jaws 246 crimp the ferrule into positive engagement with the inserted end of the unfinished pin element. At the next station the conveyor jaws 245 place the unfinished pin element 215 in a previously described forming cavity 226 formed by the pair of jaws 225. An impact member 236 is then driven electromagnetically against the outer end of the unfinished pin element 215 for axial compression of the pin element to cause the pin element to expand as heretofore described. The conveyor jaws 245 then transfer the pin connector to the next station where the expanded or finished pin element 238 is inserted into a sizing orifice of a sizing member 240 as heretofore described.

In a pin connector fabricated as described to this point, the individual wires that form the outer circumferential surface of the pin element are of round cross section and consequently make only line contact with the inner circumferential surface of a socket in which the pin element is inserted. It is highly desirable to increase the area of contact between the pin element and the socket and for this purpose the finished pin element may be subjected either to an abrasion step or a burnishing step to change the cross-sectional configurations of the outer wires of the pin element to conform to the radius of curvature of the inner circumferential surface of a socket.

A feature of the preferred practice of the invention is that this final step may be substituted for the step of inserting a finished pin element into a sizing orifice. Thus an abrasion operation or burnishing operation may be used for the dual purpose of reducing an expanded pin element to size and of changing the configuration of the pin element for greater area of contact with a socket.

FIG. 50 illustrates how instead of the conveyor jaws 245 carrying the pin connector to a station for insertion of the pin element into a sizing orifice, the conveyor jaws carry the pin element to a station where an annular tool is employed of a character to cut away metal from the periphery of the pin element. In FIG. 50 the annular tool 248 employed for this purpose has an inner circumferential sharp cutting edge that is the diameter of a socket in which the pin element is intended to be inserted. The annular tool 48 is reciprocated axially at a vibratory rate as indicated by the double arrow 250.

FIG. 51 shows how an annular burnishing tool 254 may be substituted for the annular abrading tool 248. The annular burnishing tool 254 is of the same inside diameter as the annular abrading tool 248 but does not have a sharp inner edge. When the burnishing tool 254 is reciprocated as indicated by the arrow 250 it displaces metal, i.e. deforms the outer wires of the pin element without removing metal. The result is that the outer wires are deformed for the desired purpose and the deformed surfaces are highly polished.

FIG. 52 shows the effect of the abrading operation on a pin element of the construction shown in the previously described FIG. 2. In FIG. 52 the dotted circle 252 indicates both the inside diameter of the annular tool 248 and the inside diameter of a socket in which the pin element is intended to be inserted. It can be seen that each of the outer wires 45a that surround the core 44 is modified so that an outer surface of each wire is of cylindrical configuration to mate with the dotted circle 252.

It has been found that the new configuration not only increases the area of contact between the pin element and the cooperating socket but also reduces wear when the pin element is repeatedly inserted into the socket and withdrawn from the socket. The decreased wear is explained by the fact that the greater area results in reduced unit pressure between the resilient pin element and the surrounding socket.

FIG. 53 shows the effect of the burnishing tool 254 on a pin element that is constructed as indicated by the previously described FIG. 2. It can be seen in FIG. 53 that portions of the outer wires 45b that surround the core 44 are shaped to conform to the dotted circle 252 that represents the inner circumference of a socket in which the pin element is to be inserted.

FIG. 54 shows the effect of the burnishing operation on a pin element of the construction shown in the previously described FIG. 34. It can be seen that the outer wires 132a of the pin element are deformed in the previously described manner to increase the area of contact between the pin element and a surrounding socket indicated by the dotted circle 252. In like manner FIG. 55 shows the effect of the burnishing operation on a pin element of the construction shown in the previously described FIG. 39. It can be seen that the outer wires 146a that surround the three core wires 145 are modified in cross-sectional configuration to result in a greater area of contact with the inner circumference 252 of the socket in which the pin element is intended to be inserted.

My description in specific detail of the selected practices of the invention will suggest various changes, substitutions and other departures from my disclosure within the spirit and scope of the appended claims.

I claim:
1. A method of fabricating a pin connector including a pin element for use with a cooperating socket connector of a given inside diameter, characterized by the steps of:
  winding a plurality of resilient metal wires helically around at least one elongated metal member having a given elastic limit to form a pin element of less diameter than said given diameter comprising an axial core surrounded by a cluster of helical wires;
  fixedly connecting the opposite ends of the helical wires of the pin element to the corresponding ends of the core; and
  expanding the diameter of the pin element by subjecting the axial core of the pin element to axial contraction beyond said given elastic limit to bow the helical wires to make the pin element resiliently radially contractible.

2. A method of fabricating a pin connector for use with a cooperating socket connector of a given inside diameter, characterized by the steps of:
  winding a plurality of resilient metal wires helically around at least one elongated metal member to form a pin element comprising an axial core surrounded by a cluster of helically formed wires;
  fixedly interconnecting the end of the core and the corresponding ends of the helical wires at one end of the pin element;
  placing said pin element in a circuit with an electrode;
  positioning said electrode near the other end of the pin element;
  energizing said circuit to create an arc between the electrode and said other end of the pin element to fuse together the other end of the core and the corresponding ends of the helical wires to form a solid nose on said other end of the pin element; and
  bowing intermediate portions of said helical wires radially outward from the core permanently to make the pin element resiliently radially contractible.

3. A method as set forth in claim 2 in which said bowing step is carried out by subjecting the pin element to axial contraction beyond its elastic limit.

4. A method as set forth in claim 2 in which said circuit includes capacitor means and said capacitor means is discharged to energize the circuit.

5. A method as set forth in claim 4 in which the capacitor introduces a sharp pulse of high voltage into the circuit to initiate the arc.

6. A method of fabricating a pin connector for use with a cooperating socket connector, characterized by the steps of:
  winding a plurality of resilient metal wires helically around at least one metal wire to form a pin element having given elastic limits and comprising an axial core surrounded by a cluster of helical wires;
  fixedly connecting the end of the core to the corresponding ends of the helical wires at one end of the pin element;
  placing the pin element in a circuit with an electrode of corrosion-resisting metal with the electrode spaced from the other end of the pin element;
  energizing said circuit to create an arc between the electrode and said other end of the pin element to fuse together the other end of the core and the other ends of the helical wires to form a solid nose on the end of the pin element and to transfer a portion of the electrode metal to the pin element to form a plating of the electrode metal on said nose; and
  stressing the pin element beyond its elastic limits to bow intermediate portions of said helical wires radially outward from the core to make the pin element resiliently radially contractible.

7. A method as set forth in claim 6 in which said helical wires are made of copper and said electrode is made of gold.

8. A method of fabricating a pin connector for use with a cooperating socket connector, characterized by the steps of:

winding a plurality of relatively hard resilient wires helically around a core consisting of at least one wire to form a composite metal strand;

drawing said strand through an orifice to force said helical wires against the core to indent the core;

severing an end portion of said strand to form a pin element comprising an axial core and a cluster of wires extending helically around the core;

fixedly connecting the opposite ends of the wires of said cluster to the corresponding ends of said core; and reducing the effective length of the core by stress application beyond the elastic limits of the core to bow intermediate portions of the helical wires radially outward from the core to make the pin element resiliently radially contractible.

9. A method of fabricating a pin connector for use with a cooperating socket connector characterized by the steps of:

winding a first set of resilient wires helically in one rotary direction around at least one wire;

winding a second set of resilient wires helically around the first set in the opposite rotary direction to form a pin element comprising an axial core surrounded by a cluster of oppositely wound helical wires;

fixedly connecting the opposite ends of the helical wires to the corresponding ends of the core; and stressing the pin element beyond its elastic limit to bow the cluster wires radially outward to increase the diameter of the pin element and to make the pin element resiliently radially contractible.

10. A method as set forth in claim 9 in which the step of fixedly connecting the helical wires to the core at at least one end of the pin element comprises heating the end of the pin element to fuse the core and the helical wires together to form a solid nose on the end of the pin element.

11. A method of fabricating a pin connector of a given diameter for use with a cooperating socket connector characterized by the steps of:

winding a plurality of resilient metal wires helically around at least one elongated member to form a pin element comprising an axial core surrounded by a cluster of helical wires;

fixedly connecting the opposite ends of the helical wires to the corresponding ends of the core;

stressing said pin element beyond its elastic limits to bow said helical wires from the core to increase the diameter of the pin element to a larger diameter than said given diameter; and forcing the expanded pin element into a sizing orifice substantially smaller in diameter than the expanded pin element to contract the pin element radially beyond its elastic limits to reduce the diameter of the pin element to said given diameter.

12. A method of fabricating a pin connector of a given diameter for use with a cooperating socket connector characterized by the steps of:

winding a plurality of resilient metal wires helically around at least one elongated metal member to form a pin element having given elastic limits and comprising an axial core surrounded by a cluster of helical wires;

fixedly connecting the opposite ends of the helical wires to the corresponding ends of the core;

placing said pin element in a cavity of larger diameter than said given diameter;

stressing the pin element to radially expand the pin element to conform with the cavity, the cross section of the cavity being sufficient for the pin element to be expanded beyond its elastic limits to cause the pin to assume an expanded configuration of larger diameter than said given diameter; and forcing the expanded pin element into a sizing orifice smaller in diameter than said given diameter to contract the pin element radially beyond its elastic limits to reduce the diameter of the pin element to said given diameter.

13. A method of fabricating a pin connector for use with a cooperating socket connector, characterized by the steps of:

winding a plurality of resilient wires helically around at least one metal wire to form a pin element comprising an axial core having given elastic limits and surrounded by a cluster of helical wires;

fixedly interconnecting the helical wires and the core at one end of the pin element;

fusing the helical wires to the core at the other end of the pin element to form a solid nose on the pin element;

placing an impact member adjacent one end of the pin element with a coil of wire surrounding the impact member;

charging a capacitor means with a predetermined charge of electricity; and discharging said capacitor means through said coil for magnetically driving the impact member against the end of the pin element to shorten the effective length of said core beyond its elastic limits for expanding the pin element radially to make the pin element resiliently radially contractible.

14. A method as set forth in claim 13 which includes the step of inserting said pin element into a forming cavity and then energizing said circuit to expand the pin element radially to conform with the configuration of the cavity.

15. A method of fabricating a pin connector for use with a cooperating socket connector, characterized by the steps of:

twisting a plurality of wires together in one rotary direction;

winding a plurality of wires in the opposite rotary direction around the twisted wires to form a pin element comprising a twisted wire core and an outer cluster of helical wires;

fixedly connecting the opposite ends of the core to the corresponding ends of the helical wires; and stressing the core beyond its elastic limits to bow intermediate portions of the helical wires outward to make the pin element resiliently radially contractible.

16. A method of fabricating a pin element for insertion into a socket to make an electrical connection, characterized by the steps of:

twisting a plurality of metal wires around an axial core wire to make a multiple wire strand;

severing a short length from the strand;

fixedly interconnecting the ends of the wires at one end of the short length;

applying heat to the ends of the wires at the other end of the short length to fuse all of the wires together to form a rounded nose thereby providing a pin element with a rounded nose on its leading end; and compressing the pin element axially beyond its elastic limits to permanently shorten the pin element including the core wire and thereby permanently expand the pin element radially.

17. A method of fabricating a pin element for insertion into a socket to make an electrical connection, characterized by the steps of:

winding a plurality of metal wires around an axial core wire to make a multiple wire strand;

severing a short length from the strand;

applying electric arcs to the opposite ends of the short length to fuse the ends of the wires together to form a pin element with rounded solid metal noses at its opposite ends; and compressing the pin connector axially beyond its elastic limits to permanently shorten the pin element including the core wire and thereby permanently expand the pin element radially, the fusing together of the wires at the opposite ends of the pin element preventing longitudinal slippage of the wires relative to each other when the pin element is axially compressed.

18. A method of fabricating a pin element for insertion into a socket to make an electrical connection, characterized by the steps of:

twisting a plurality of metal wires around an axial core wire to make a multiple wire strand;

severing a short length from the strand;

fixedly interconnecting the ends of the wire at one end of the short length;

applying heat to the ends of the wires at the other end of the short length to fuse all of the wires together to form a rounded nose thereby providing a pin element with a rounded nose on its leading end;

placing the pin element in a forming cavity of substantially greater cross-sectional dimension than the pin element; and comprising the pin element axially beyond its elastic limits while in the forming cavity to permanently bow wires outward from the pin element against the surrounding surface of the cavity and to permanently shorten the core wire to expand the diameter of the pin element substantially beyond the diameter of a socket in which it is intended to fit.

19. A method as set forth in claim 18 which includes the further step of forcing the expanded pin element into a sizing orifice to reduce the diameter of the pin element to a new diameter greater than the diameter of the socket.

20. A method of fabricating a pin element for insertion into a socket to make an electrical connection, characterized by the steps of:

winding a plurality of metal wires around an axial core wire to make a multiple wire strand;

severing a short length from the strand;

fixedly interconnecting the ends of the wire at one end of the short length;

applying heat to the ends of the wires at the other end of the short length;

to form a rounded nose thereby providing a pin element with a rounded nose on its leading end;

compressing the pin element axially beyond its elastic limits to permanently shorten the pin element including the core wire and thereby permanently expand the pin element radially, the fusing together of the wires at the opposite ends of the pin element preventing longitudinal slippage of the wires relative to each other when the pin element is axially compressed;

placing the pin element concentrically inside an annular tool of an inside diameter of the inside diameter of the socket in which the pin element is intended to fit with consequent resilient contraction of the pin element to approximately the diameter of the socket; and creating repetitive relative axial reciprocation between the pin element and the tool to cause the tool to traverse at least a portion of the length of the pin element to give outer surfaces of the wires of the pin element the radius of curvature of the inner circumferential surface of the socket.

21. A method as set forth in claim 20 in which said tool is a sharp edge orifice member.

22. A method as set forth in claim 20 in which said tool is an annular burnishing tool to deform the wires of the pin element without significant removal of metal from the wires.

23. A method of fabricating a pin element for insertion into a socket to make an electrical connection, characterized by the steps of:

winding a plurality of metal wires around an axial core wire to make a multiple wire strand;

severing a short length from the strand;

fixedly interconnecting the ends of the wires at one end of the short length;

applying heat to the ends of the wires at the other end of the short length to fuse all of the wires together to form a rounded nose thereby providing a pin element with a rounded nose on its leading end;

placing the pin element in a forming cavity of substantially greater cross-sectional dimension than the pin element;

compressing the pin element axially beyond its elastic limits while in the forming cavity to permanently bow wires outward from the core wire and permanently shorten said core wire to expand the diameter of the pin element substantially beyond the diameter of a socket in which it is intended to fit;

placing the expanded pin element concentrically inside an annular tool of an inside diameter equal to the inside diameter of the socket in which the pin element is intended to fit, with consequent resilient contraction of the pin element to approximately the diameter of the socket; and creating repetitive relative axial reciprocation between the pin element and the tool to cause the tool to traverse at least a portion of the length of the pin element with consequent change in the surfaces of the outer wires of the pin element for greater area of contact of the pin element with the socket in which it is intended to fit.

24. A method of fabricating a pin element for insertion into a socket to make an electrical connection, characterized by the steps of:

winding a plurality of metal wires around an axial core wire to make a multiple wire strand;

severing a short length from the strand;

fixedly interconnecting the ends of the wire at one end of the short length;

applying heat to the ends of the wires at the other end of the short length to fuse all of the wires together to form a rounded nose thereby providing a pin element with a rounded nose on its leading end;

opening a pair of jaws which cooperate to form a forming cavity;

moving the pin element laterally into the jaws and closing the jaws to enclose the pin element in the forming cavity; and compressing the pin element axially beyond its elastic limits while in the forming cavity to permanently bow wires outward from the core wire against the surrounding surface of the cavity to permanently shorten the core wire and to expand the diameter of the pin element substantially beyond the diameter of a socket in which it is intended to fit.

25. A method of fabricating a pin element for insertion into a socket to make an electrical connection, characterized by the steps of:

winding a plurality of resilient alloy wires around at least one soft copper wire to form a strand comprising a cluster of helical wires around a soft copper axial core;

severing a short length from the strand;

fixedly interconnecting the wires at one end of the short length;

applying heat to the ends of the wires at the other end of the short length to fuse all of the wires together to form a rounded nose thereby forming a pin element with a rounded nose on its leading end; and compressing the pin element axially to bow the cluster wires thereof beyond their elastic limits and correspondingly deform the soft copper core to permanently shorten the pin element and permanently expand the pin element radially.

26. A method of fabricating a pin connector for insertion into a socket to make an electrical connection, characterized by the steps of:

winding a plurality of metal wires around an axial core wire to make a multiple wire strand;

severing a short length from the strand;

applying electric arcs to the opposite ends of the short length to fuse the ends of the wires to form a pin element with rounded solid metal noses at its opposite ends;

inserting one end portion of the pin element into one end of a ferrule;

crimping the ferrule into permanent engagement with the inserted end portion of the pin element to form a pin connector; and compressing the pin element axially against the ferrule to stress the pin element beyond its elastic limits to permanently shorten the pin element including the core wire and thereby permanently expand the pin element radially to greater diameter than the socket in which it is intended to fit, the fusing together of the wires at the opposite ends of the pin element preventing longitudinal slippage of the wires relative to each other when the pin element is axially compressed.

27. In a method of treating a resiliently radially contractible multiple wire pin element of the general character described to increase the area of contact between the pin element and the inner circumferential surface of a socket in which it is intended to be inserted, the improvement comprising the steps of: inserting the pin element into an annular tool of the same inside diameter as said socket, and creating repetitive relative axial reciprocation between the pin element and the tool to abrade the outer surfaces of wires of the pin and give them the radius of curvature of the inner circumferential surface of the socket.

References Cited

UNITED STATES PATENTS

| 1,147,824 | 7/1915 | Soule | 15—104.19 |
| 1,562,327 | 11/1925 | Hedeen | 15—104.09 |
| 3,277,560 | 10/1966 | Frank et al. | 29—155.55 |
| 662,071 | 11/1900 | Joughins | 10—27 |
| 1,324,177 | 12/1919 | Sherman | 29—630 |

FOREIGN PATENTS

| 1,030,908 | 1/1951 | France. |
| 1,267,457 | 9/1960 | France. |

JOHN F. CAMPBELL, *Primary Examiner.*

R. CHURCH, *Assistant Examiner.*